(12) United States Patent
Li et al.

(10) Patent No.: US 10,489,576 B2
(45) Date of Patent: Nov. 26, 2019

(54) METHOD AND SYSTEM FOR GENERATING VERIFICATION CODES

(71) Applicant: Alibaba Group Holding Limited, George Town (KY)

(72) Inventors: Jiajia Li, Hangzhou (CN); Xinlin Yu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/704,819

(22) Filed: May 5, 2015

(65) Prior Publication Data
US 2015/0324573 A1 Nov. 12, 2015

(30) Foreign Application Priority Data
May 8, 2014 (CN) .......................... 2014 1 0194197

(51) Int. Cl.
G06F 7/04 (2006.01)
G06F 21/36 (2013.01)
G06F 21/31 (2013.01)
H04L 29/06 (2006.01)

(52) U.S. Cl.
CPC ............. *G06F 21/36* (2013.01); *G06F 21/316* (2013.01); *H04L 63/08* (2013.01); *H04L 63/14* (2013.01); *G06F 2221/2133* (2013.01)

(58) Field of Classification Search
CPC ....... H04L 63/08; H04L 63/0428; H04L 9/08; G06F 21/31; G06F 21/6218
See application file for complete search history.

(56) References Cited

U.S. PATENT DOCUMENTS

| 5,778,013 | A | 7/1998 | Jedwab |
| 7,174,460 | B2 * | 2/2007 | Horita ..................... G06F 21/64 380/286 |
| 8,601,538 | B2 | 12/2013 | Qvarfordt |

(Continued)

FOREIGN PATENT DOCUMENTS

| EP | 2801923 | 11/2014 |
| JP | 2011048497 | 3/2011 |

(Continued)

OTHER PUBLICATIONS

Vinay Shet: "Google Online Security Blog: reCAPTCHA just got easier (but only if you're human)", Oct. 25, 2013, Retrieved on Jul. 23, 2015 at http://googleonlinesecurity.blogspot.de/2013/10/recaptcha-just-got-easier-but-only-if.html.

(Continued)

*Primary Examiner* — Shewaye Gelagay
*Assistant Examiner* — Carlton Johnson
(74) *Attorney, Agent, or Firm* — Van Pelt, Yi & James LLP

(57) ABSTRACT

Generating verification codes includes selecting at least two verification code generators from a verification code generator set comprising a plurality of verification code generators to compose a current use set, executing each verification code generator in the current use set to obtain corresponding partial verification codes, composing a current verification code from the partial verification codes, outputting the current verification code to a user, receiving a user response that is made in response to the current verification code, and comparing the current verification code and the user response to determine whether the user is verified.

19 Claims, 11 Drawing Sheets

(56) References Cited

U.S. PATENT DOCUMENTS

| | | | |
|---|---|---|---|
| 8,904,493 B1* | 12/2014 | Dibble | H04L 63/08 726/4 |
| 2003/0035646 A1 | 2/2003 | Salvatori et al. | |
| 2004/0088587 A1* | 5/2004 | Ramaswamy | G06F 21/31 726/5 |
| 2005/0201561 A1* | 9/2005 | Komano | H04L 9/3249 380/255 |
| 2006/0248333 A1* | 11/2006 | Sandhu | H04L 9/0825 713/155 |
| 2009/0164793 A1* | 6/2009 | Yoshioka | H04N 7/1675 713/180 |
| 2010/0229223 A1 | 9/2010 | Shepard | |
| 2013/0104187 A1* | 4/2013 | Weidner | G06F 21/45 726/1 |
| 2013/0145441 A1 | 6/2013 | Mujumdar et al. | |
| 2014/0059663 A1 | 2/2014 | Rajshekar | |
| 2014/0109207 A1 | 4/2014 | Hou | |
| 2014/0173713 A1 | 6/2014 | Zheng et al. | |
| 2015/0200934 A1* | 7/2015 | Naguib | G06F 21/575 713/2 |

FOREIGN PATENT DOCUMENTS

| | | |
|---|---|---|
| JP | 2011118742 | 6/2011 |
| WO | 2013103019 | 7/2013 |

OTHER PUBLICATIONS

Vinay Shet: "Google Online Security Blog: CAPTCHAs the capture your heart", Feb. 14, 2014, Retrieved on Jul. 23, 2015 at http://googleonlinesecurity.blogspot.de/2014/02/captchas-that-capture-your-heart.html.

Anonymous: "reCAPTCHA—Wikipedia, the free encyclopedia", May 7, 2014, Retrieved Jul. 23, 2015 at https://en.wikipedia.org/w/index.php?title=ReCAPTCHA&oldid=607486748.

Zhu et al. "Towards New Security Primitives Based on Hard AI Problems." Security Protocols XXI. Springer Berlin Heidelberg, 2013. 3-10.

Anonymous: "Verifying the User's Answer Without Plugins—reCAPTCHA—Google Developers" Mar. 28, 2014, Retrieved on Jul. 23, 2015 at https://web.archive.org/web/20140328160916/https://developers.google.com/recaptcha/docs/verify.

\* cited by examiner

What Day Is
Today?

FIG. 4

What Day Is Today?

700

800

METHOD AND SYSTEM FOR GENERATING VERIFICATION CODES

CROSS REFERENCE TO OTHER APPLICATIONS

This application claims priority to People's Republic of China Patent Application No. 201410194197.7 entitled A METHOD AND A DEVICE FOR GENERATING VERIFICATION CODES, filed May 8, 2014 which is incorporated herein by reference for all purposes.

FIELD OF THE INVENTION

The present application relates to a method and system for generating verification codes.

BACKGROUND OF THE INVENTION

While the Internet provides people with convenience, the Internet has also brought various risks. Some malicious users employ bots to improperly use Internet resources on a large scale. For example, some malicious users use automatic registering tools to batch register website accounts, inject meaningless characters, submit garbage data to servers, etc. Some malicious users waste server resources and affect the normal use of legitimate users. Also some malicious users continually access servers in an attempt to figure out the account passwords of legitimate users, thus these malicious users threaten the privacy and interests of legitimate users. Therefore, servers typically deploy techniques that can automatically distinguish between legitimate and malicious users and thereby reduce the risk of malicious use.

Verification codes are used to differentiate between legitimate and malicious users. Various methods for generating verification codes exist, such as verification by ASCII characters, questions and answers, and speech. Verification codes are generated by selecting the use of one of these types of methods on a server. However, with optical character recognition technology, automatic answering technology, and speech recognition technology, programs can increasingly submit correct verification codes automatically, and blocking malicious users has been increasingly difficult.

BRIEF DESCRIPTION OF THE DRAWINGS

Various embodiments of the invention are disclosed in the following detailed description and the accompanying drawings.

FIG. 4 is an illustration of an example of a partial verification code generated by a question-and-answer verification code generator.

DETAILED DESCRIPTION

Figure 1:
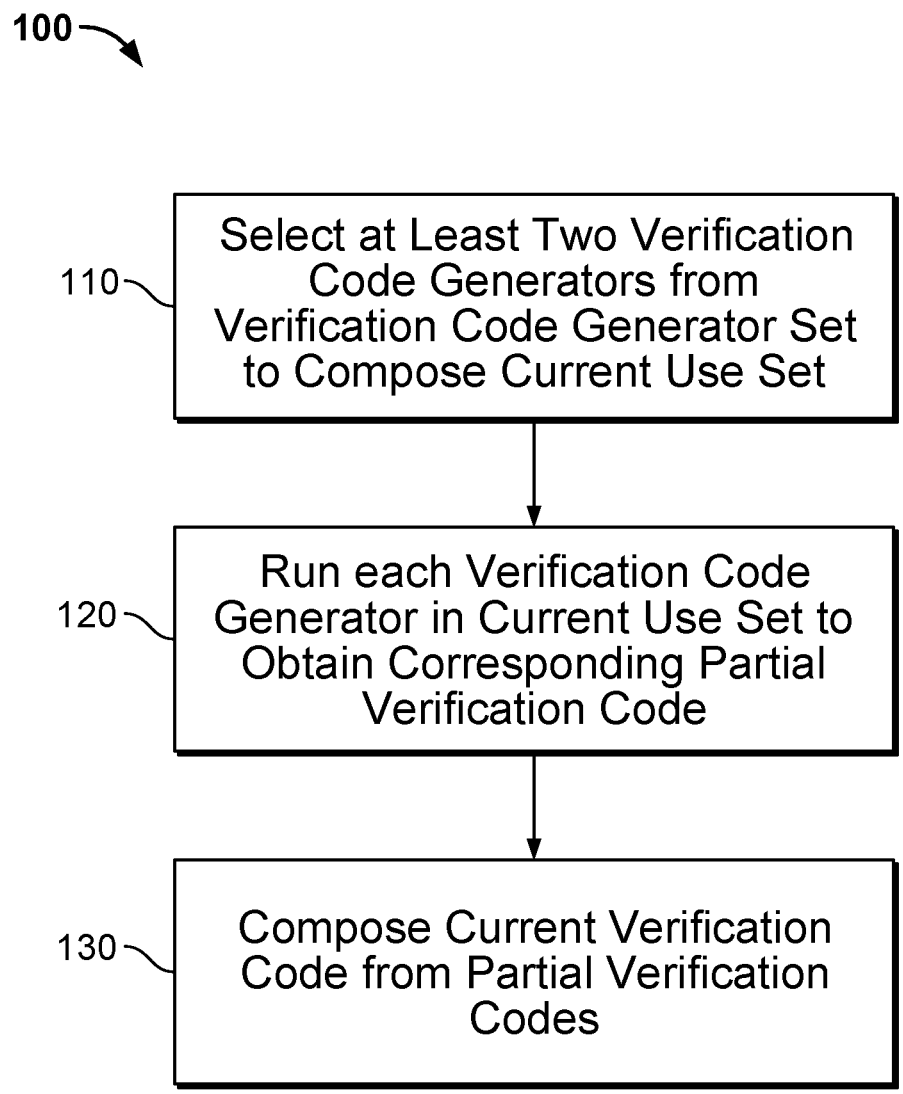
FIG. 1 is a flowchart of an embodiment of a process for generating verification codes.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventionally, various kinds of verification code generators exist. For example, a digital verification code generator, ASCII character verification code generator, Chinese character verification code generator, question-and-answer verification code generator, or picture-based verification code generator respectively generates, based on their respective generation techniques, several numbers, several ASCII characters, several Chinese characters, a question, or an image. The user is to input the same numbers, the same ASCII characters, the same Chinese characters, or the same answer as the verification code checksum in order to pass verification. In another example, a speech verification code generator generates a segment of speech based on a specific technique and plays the segment of speech to the user. The user is to input characters based on the speech or the correct answer in order to pass verification. Various technologies are correspondingly employed to break these verification codes. For example, optical character recognition technology can recognize the numbers, the ASCII characters, and the Chinese characters in the picture. Automatic answering technology can read questions based on recognized text and provide answers. A speech recognition technology or a combination of a speech recognition technology and an automatic answering technology can be used to break speech verification codes. In some embodiments, each verification code generator stores pairs of verification codes and corresponding verification code checksums, and randomly selects a pair when a request to provide a verification code is received. As described herein, verification code generator techniques can be divided into different verification modes (e.g., digital verification mode, ASCII character verification mode, Chinese character verification mode, speech verification mode, question-and-answer verification mode, picture-based verification mode, etc.) based on differences in the code-breaking technology to be performed.

Although all verification code generators use multiple measures to increase the difficulty of code-breaking, achieving a high code-breaking success rate against a specific verification code generator after targeted optimization of the code-breaking technique is possible. Such a code-breaking technique often is ineffective against another verification code generator even if the two verification code generators use the same verification mode. For example, code-breaking technique 1 has a success rate of 0.8 against verification code generator 1 and a success rate of 0.7 against verification code generator 2. If the verification code generator 1 and the verification code generator 2 are used in combination, then the success rate of code-breaking technique 1 drops to 0.56. Assuming that the success rate of code-breaking technique 2 against verification code generator 2 is 0.8, the highest achievable success rate drops to 0.64 in the event that code-breaking technique 1 is used in combination with code-breaking technique 2.

FIG. 1 is a flowchart of an embodiment of a process for generating verification codes. In some embodiments, the process 100 is implemented by a server 810 of FIG. 8 and comprises:

In some embodiments, the server or other computing equipment includes a verification code generator set which includes at least two verification code generators. In some embodiments, a verification code generator is included in an executable program. In some embodiments, a code or an identifier is used to represent a corresponding verification code generator within a verification code generator set. In some embodiments, various verification code generators are incorporated into the set, including verification code generators of the same verification mode and different techniques, and verification code generators that use different verification modes. As verification technology develops, new verification code generators can be incorporated into the verification code generator set as the new verification code generators appear. Of course, a verification code generator set can include verification code generators selected based on verification code class and attribute requirements.

In some embodiments, the verification code class refers to whether the desired verification code is a numerical verification code, a text-based verification code, a character-based verification code, or some other type of verification code. When each class of verification code is generated, certain attribute requirements for forming the class of the verification code can be specified. Examples of attribute requirements include: the verification code corresponds to a 4 digit number, the verification code includes only digits between 3 and 9, the verification code requires positions of the randomly generated characters to be shifted, etc. Based on the verification code class and the attribute requirements, various expressions and values for a specific verification code class can be generated, e.g., 3456 3457 5698.

In 110, the server selects at least two verification code generators from a verification code generator set to compose a current use set.

The manner in which verification code generators are selected from the verification code generator set is not restricted. In some embodiments, a screening technique or a way of specifying a screening technique is employed based on specific security needs on the server, user preferences, or other such factors. For example, in a low risk setting where a low level of security is needed, a low number (e.g., two) of verification generators is used in a low security screening technique. In a high risk setting, a large number (e.g., four or more) of verification generators is used in a high security screening technique. As used herein, a screening technique specifies which verification code generators are selected and in what order. In other words, the screening technique specifies a sequence of verification code generators.

The verification code generation process is based on a combination of various verification code generators. In a low risk setting, a simple verification code can be generated. For example, when the verification code is generated, the verification code is 4 digits with each digit having a value between 3 and 9, so the user is shown a verification code such as, for example, 3467. In a high risk setting, to verify that the user is not a bot, a combination of verification code generators can be used (e.g., the verification code is generated based on a combination of multiple partial verification codes). Using the combination of multiple partial verification codes, machine learning is more difficult because a single verification code class is not used but instead a combination of various verification code classes is used. For example, two verification code classes such numbers plus Chinese characters can be used. For example, the user will be shown a verification code like 3456中国, where 中国 corresponds to "China" in Chinese characters.

For example, one can randomly select M (M being a natural number greater than or equal to 2 and less than or equal to N) verification code generators from a set including N (N being a natural number greater than or equal to 2) verification code generators and, based on the order in which the verification code generators appear in the set, organize the screening techniques of the current use set. In this way, the current use set will have C (N, M) possibilities $$\left(N \text{ choose } M \text{ or } \frac{N(N-1) \ldots (N-M+1)}{M(M-1) \ldots 1}\right)$$

combinations). If M verification code generators are randomly selected, and the screening techniques of the current use set are organized based on their order of selection, then the current use sequence is to have P (N, M) possibilities (N (N−1) (N−2) . . . (N−M+1) permutations). Under these circumstances, the current use set is to actually indicate a verification generator series.

In another example, assume that a verification code generator set includes seven verification code generators, three of the verification code generators use an ASCII character verification mode, two of the verification code generators use a speech verification mode, and two of the verification code generators use a question-and-answer verification mode. Any two verification modes can be selected. From each verification mode, any verification code generator can be selected to compose the current use set. Alternatively, one verification code generator can be selected from each of the three verification modes and then randomly sequenced to compose the current use set.

The above two examples can be regarded as situations in which fixed screening techniques are utilized. In some embodiments, varying screening techniques can be used to generate the current use set. For example, the process 100 rotates through any two, any three, or any four verification code generators. The current use set is to include two, three or four verification code generators, and the number of verification code generators included each time differs from the previous time.

In one implementation, one or more screening techniques are first pre-established. When verification code generators are selected for the current use set, one screening technique is specified from among the one or more pre-established screening techniques. At least two verification code generators are selected from the verification code generator set based on a specified screening technique. In the one implementation, any screening technique can be pre-established. No restriction is imposed on the specifying of one of the screening techniques to generate the current use set.

For example, one screening technique is randomly selected from among the one or more pre-established screening techniques, or more than one of the pre-established screening techniques are used in rotating fashion. In another example, for a client at the same address, a screening technique other than the previously used screening technique is selected.

In some embodiments, the screening technique that is used can be selected based on behavior records of a user. In cases where the pre-established techniques have different levels of complexity (e.g., some screening techniques are marked as high complexity), a technique of a certain complexity level can be selected based on the user's historical behavior records.

For example, the number of login failures of a user within a fixed time segment is recorded. In the event that the number of failures is 0 within the fixed time segment, a screening technique that combines two numerical verification code generators can be employed. In the event that the number of failures is 1 within the fixed time segment, a screening technique that combines one numerical verification code generator and one question-and-answer verification code generator can be used. In the event that the number of failures is greater than or equal to 2 within the fixed time segment, a screening technique that combines verification code generators of four verification modes can be used. In another example, in the event that a user is suspected of having used a bot to automatically log in, a screening technique of the highest level of complexity is used for the user.

An overly complex verification code can increase security, but can also encumber users with a certain degree of inconvenience. Estimating a user's subjective intentions based on the user's historical behavior records and applying a verification code with the corresponding degree of complexity can achieve a better balance between security and user convenience.

Please note that, in the present embodiment, the current use set can be a set of currently used verification code generators. The current use set can also be a sequence of verification code generators in current use. In other words, the current use set can be unrelated to the order of elements, or the current use set can be related to the order of elements.

In 120, the server runs each verification code generator in the current use set to obtain a corresponding partial verification code.

After the current use set has been generated, each verification code generator in the current use set can be separately run. Each verification code generator generates a partial verification code corresponding to the generator's own technique. At the same time, each verification code generator also generates a corresponding partial verification code checksum, whose value corresponds to a correct output of the verification code generator. For example, for an ASCII verification code generator that outputs an ASCII value as the verification code, the partial verification code checksum is the value being output; for a question-and-answer verification generator that outputs a question as the verification code, the partial verification code checksum is the expected answer in response to the question; for a picture-based verification code generator that outputs an image as the verification code, the partial verification code checksum is the value shown in the image that is output. Other partial verification code checksums can be used for various types of verification code generators. The checksum has a corresponding image verification code or other types of verification codes, and is compared with what the user enters.

In 130, the server composes a current verification code from the partial verification codes.

In some embodiments, the partial verification codes generated by each verification code generator in the current use set are combined, and the combined result of the partial verification codes forms the current verification code. In some embodiments, the partial verification code checksums generated by each verification code generator are combined, and the combined result of the partial verification code checksums forms a current verification code checksum. The verification code and the corresponding verification code checksum can be combined in the same order to be able to correctly use the checksum to check whether the client has passed verification.

In some embodiments, in the event that the current use set is associated with the order of the elements, the sequence of the verification code generators in the current use set serves as a basis for combining the corresponding partial verification codes into the current verification code. Similarly, the corresponding verification code checksums are combined based on their sequence into the current verification code checksum.

In some embodiments, the fact that at least two types of verification code generators are simultaneously applied and typically the verification code generators in use are continually changing means that malicious users not only need to know how many verification code generators exist, but also how many combinations or sequences of these verification code generators exist. Even if the malicious users master these verification code generators, the malicious users would still find performing targeted optimization of the code-breaking techniques extremely difficult. The malicious users would have to spend a very long time on code-breaking, which would make achieving an acceptable success rate for code-breaking difficult for the malicious users.

Assume that the mean time spent to break a single verification code generator code is 10 ms (milliseconds) and the code-breaking success rate is 80%. If one verification code generator set includes ten verification code generators, and at the most four of these verification code generators are selected each time to make combinations of techniques, the current use set may give rise to 10,000 possibilities. The mean time spent on code-breaking would be (10×4 (1 to 10,000))=40 ms to 400 s (seconds). The code-breaking success rate would be: 0.8×0.8×0.8×0.8≈0.4. Such a code-breaking speed and success rate are very unattractive to code-breakers and may prevent the code-breakers from making code-breaking attempts.

Figure 2:
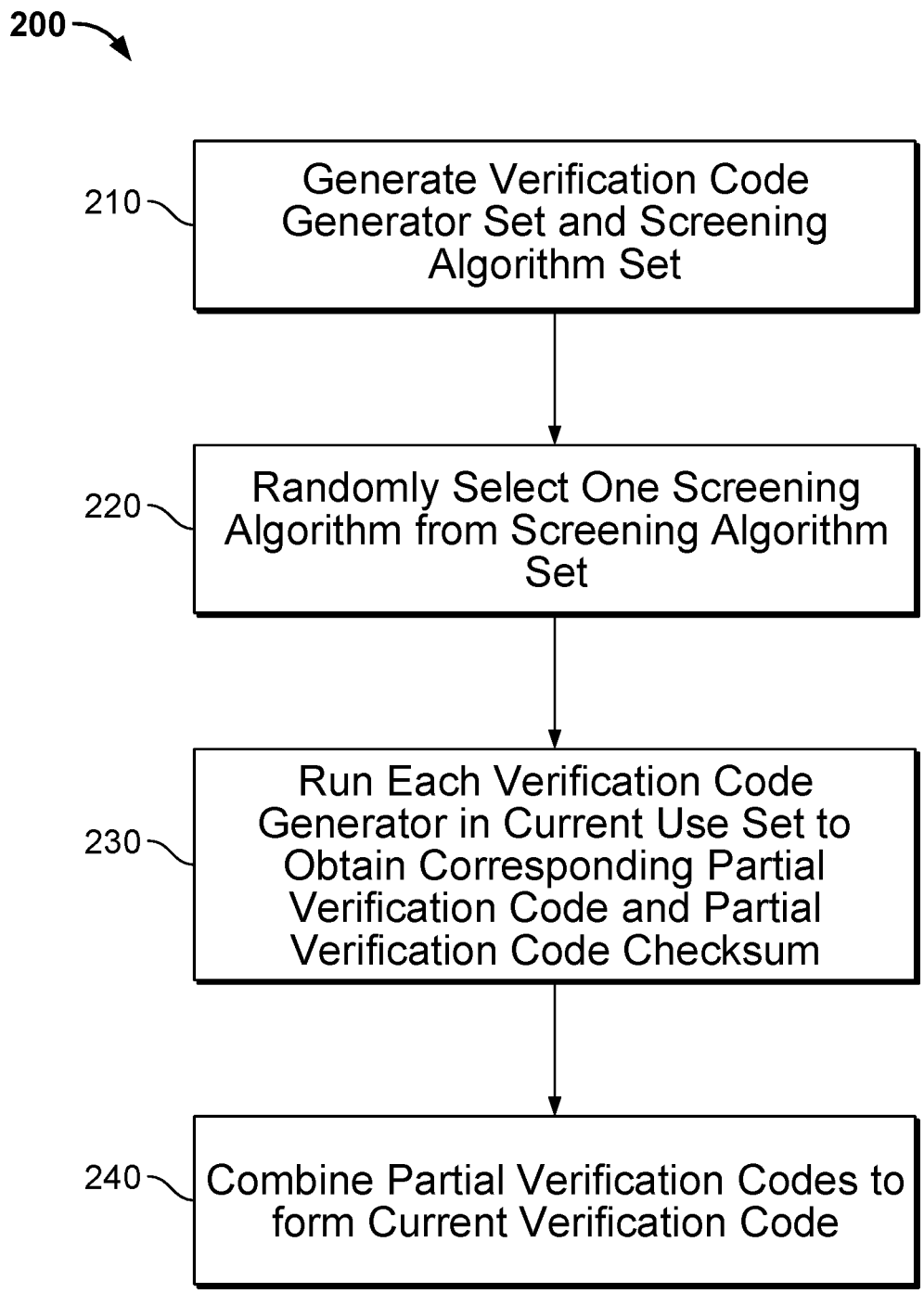
FIG. 2 is a flowchart of another embodiment of a process for generating verification codes.

FIG. 2 is a flowchart of another embodiment of a process for generating verification codes. In some embodiments, the process 200 is implemented by a server 810 of FIG. 8 and comprises:

In 210, the server generates a verification code generator set and a screening technique set.

For example, a numerical verification code generator Num1, a numerical verification code generator Num2, a mixed ASCII character verification code generator, a Chinese verification code generator, a question-and-answer verification code generator, and a picture-based verification code generator are combined to form a verification code generator set. The numbers 1 through 6 are used to sequentially represent the corresponding verification code generators. Verification code generators numbered 1 through 4 use an ASCII character verification mode, the verification code generator number 5 uses a question-and-answer verification mode, and the verification code generator number 6 uses a picture-based verification mode. In the event that a new verification code generator is to be used, the new verification code generator can be added to the verification code generator set and incrementally numbered accordingly.

The following three screening techniques can be incorporated into the screening technique set:

A. Select two verification code generators.

B. Select three verification code generators that use at least two verification modes.

C. Select the numerical verification code generator Num1 and an ASCII character verification code generator.

When adopting a new screening technique, the new screening technique can be added to the set.

In 220, the server randomly selects one screening technique from the screening technique set. The selected screening technique is used to select at least two verification code generators from the verification code generator set and form the current use set based on the at least two selected verification code generators.

In 230, the server runs each verification code generator in the current use set to obtain a corresponding partial verification code and a partial verification code checksum.

In 240, the server combines the partial verification codes to form a current verification code. In a corresponding manner, the server combines the partial verification code checksums to form a current verification code checksum.

For example, in operation 220, assume that the selected screening technique is B. The current use set that is generated in accordance with screening technique B corresponds to a mixed-character ASCII verification code generator, a question-and-answer verification code generator, and a picture-based verification code generator.

Figure 3:
FIG. 3 is an illustration of an example of a partial verification code generated by a mixed-character verification code generator.
Figure 5:
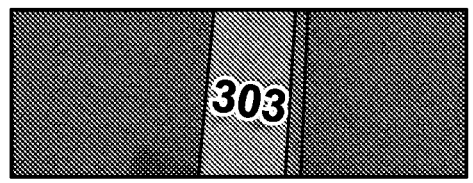
FIG. 5 is an illustration of an example of a partial verification code generated by a picture-based verification code generator.

FIG. 3 is an illustration of an example of a partial verification code generated by a mixed-character verification code generator. In operation 230 of FIG. 2, the example of the partial verification code generated by the mixed-character verification code generator is shown in FIG. 3, and a corresponding partial verification code checksum is "t00E." FIG. 4 is an illustration of an example of a partial verification code generated by a question-and-answer verification code generator. The question being output is "What Day Is Today?" The example of the partial verification code generated by the question-and-answer verification code generator is shown in FIG. 4, and a corresponding partial verification code checksum is "Thursday." FIG. 5 is an illustration of an example of a partial verification code generated by a picture-based verification code generator. The example of the partial verification code generated by the picture-based verification code generator is shown in FIG. 5, and a corresponding partial verification code checksum is "303."

Figure 6:
FIG. 6 is an illustration of an example of a current verification code.
Figure 6:

FIG. 6 is an illustration of an example of a current verification code. Thus, the current verification code generated in operation 240 is shown in FIG. 6, and a current verification code checksum is "t00E Thursday 303."

After the current verification code is generated, the server outputs the current verification code to the client. The server received user input sent back by the client and compares the user input with the current verification code checksum. If the user input and the current verification code checksum match, then the user passes verification.

Figure 7A:
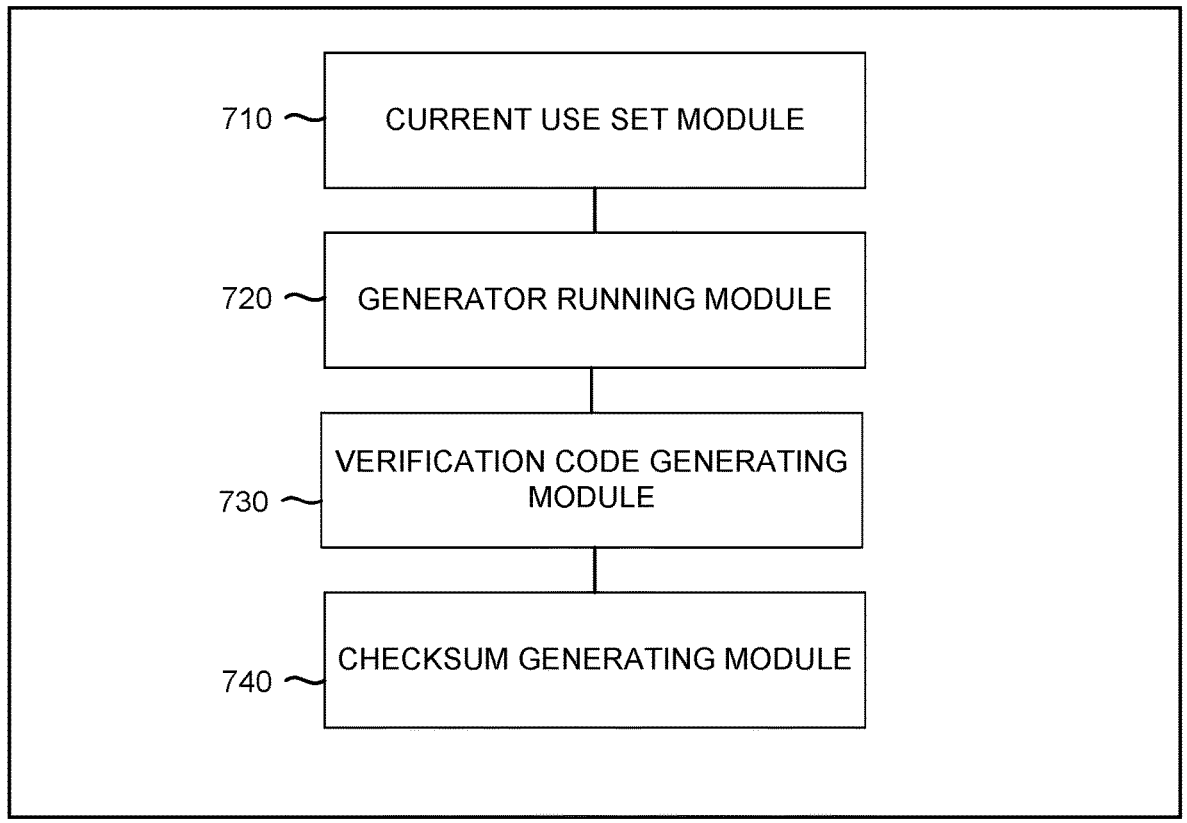
FIG. 7A is a logical structure diagram of an embodiment of a device for generating verification codes.

FIG. 7A is a logical structure diagram of an embodiment of a device for generating verification codes. In some embodiments, the device 700 implements the process 100 of FIG. 1 or the process 200 of FIG. 2 and comprises: a current use set module 710, a generator running module 720, and a verification code generating module 730.

In some embodiments, the current use set module 710 selects at least two verification code generators from a verification code generator set and combines the at least two verification code generators to form a current use set.

In some embodiments, the generator running module 720 runs each verification code generator in the current use set to obtain corresponding partial verification codes.

In some embodiments, the verification code generating module 730 combines the partial verification codes to form a current verification code.

Figure 7B:
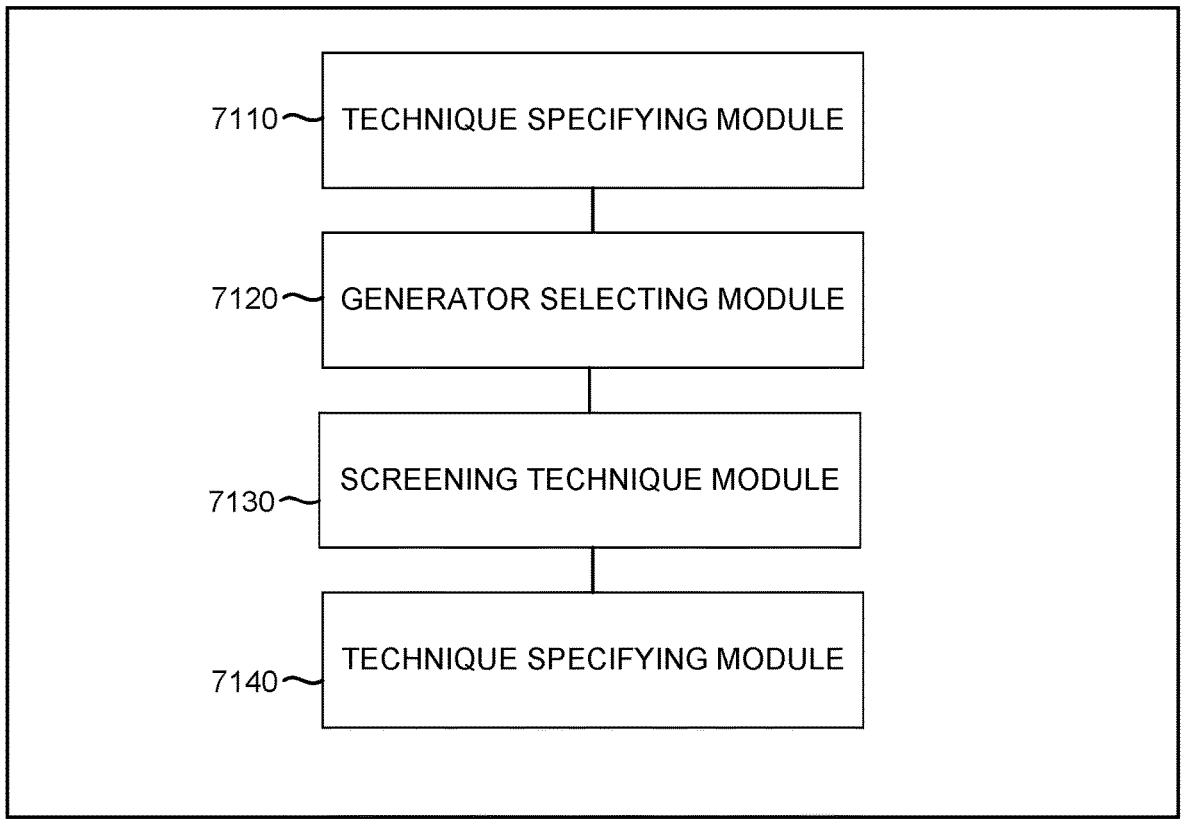
FIG. 7B is a logical structure diagram of an embodiment of a current use set module.

FIG. 7B is a logical structure diagram of an embodiment of a current use set module. In some embodiments, the current use set module 7100 is an implementation of the current use set module 710 of FIG. 7A and comprises: a technique specifying module 7110 and a generator selecting module 7120.

In some embodiments, the technique specifying module 7110 specifies a screening technique from pre-established screening techniques.

In some embodiments, the generator selecting module 7120 selects at least two verification code generators from the verification code generator set based on the specified screening technique.

In some embodiments, the pre-established screening techniques have different complexity levels.

In some embodiments, the current use set module 7100 further comprises a screening technique module 7130.

In some embodiments, the screening technique module 7130 selects techniques of certain complexity levels based on a user's historical behavior records.

In some embodiments, the current use set module 7100 further comprises a technique specifying module 7140.

In some embodiments, the technique specifying module 7140 randomly selects a screening technique from the pre-established screening techniques.

Referring back to FIG. 7A, in some embodiments, the verification code generating module 730 composes a current verification code from partial verification codes corresponding to a sequence of verification code generators in the current use set.

In some embodiments, the device 700 further comprises: a checksum generating module 740.

In some embodiments, the checksum generating module 740 composes a current verification code checksum from the partial verification code checksums generated by each verification code generator in the current use set.

Figure 7C:
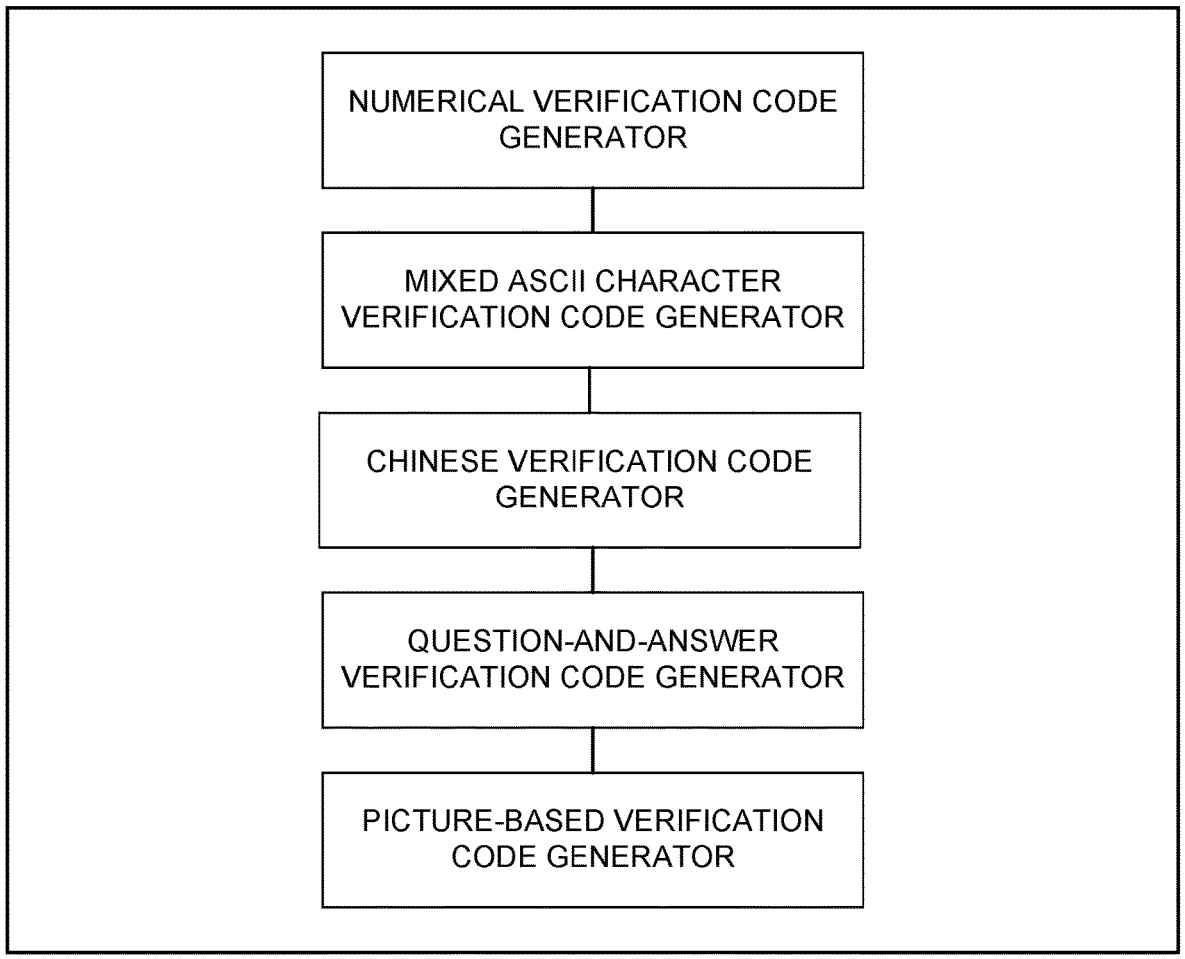
FIG. 7C is a logical structure diagram of an example of a verification code generator set.

FIG. 7C is a logical structure diagram of an example of a verification code generator set. In some embodiments, the verification code generator set comprises: a numerical verification code generator, a mixed ASCII character verification code generator, a Chinese verification code generator, a question-and-answer verification code generator, and a picture-based verification code generator.

From the above description, a conventional single verification code generator generates a verification code for each use. On the other hand, the embodiments of the present application simultaneously use two or more verification code generators to generate verification codes and typically change the verification code generator with each use. Thus, not only does the time required for code-breaking increase, but also code-breaking success rate is reduced and network security is increased.

The embodiments of the present application also provide a verification code generation device that corresponds to the implementation of the process flow described above. This device can be implemented through software, or the device can be implemented through hardware or a combination of software and hardware.

Figure 8:
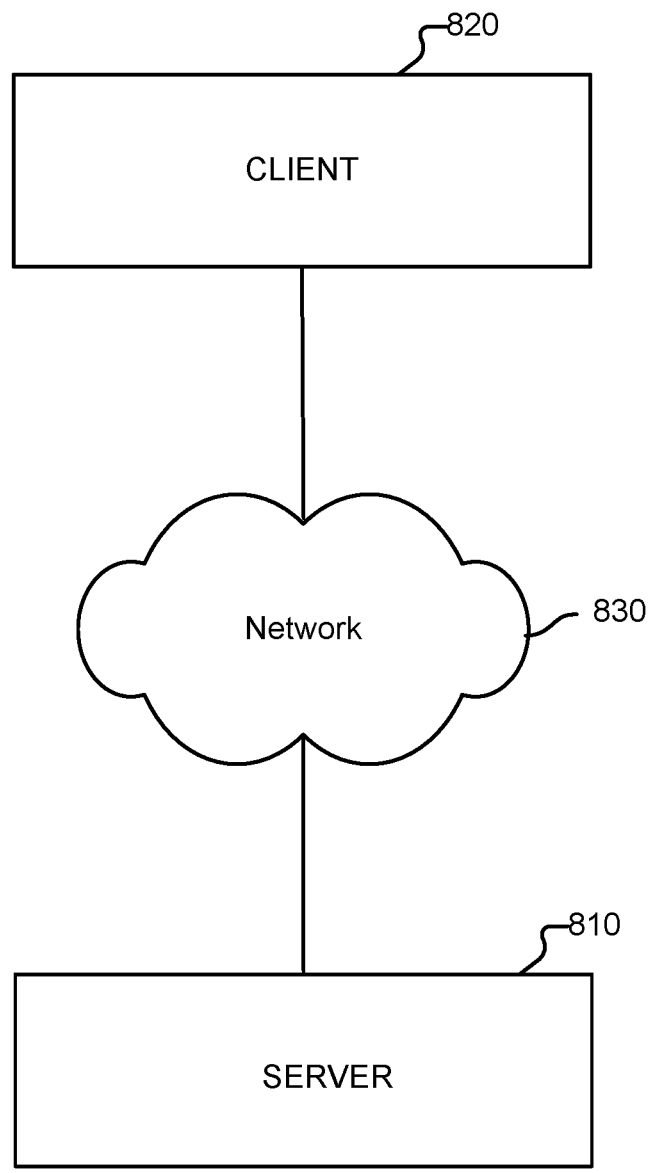
FIG. 8 is a diagram of an embodiment of a system for generating verification codes.

FIG. 8 is a diagram of an embodiment of a system for generating verification codes. In some embodiments, the system 800 includes a server 810 connected to a client 820 via a network 830.

In some embodiments, the server 810 selects at least two verification code generators from a verification code generator set to compose a current use set, operates each verification code generator in the current use set to obtain corresponding partial verification codes, and composes a current verification code from the partial verification codes.

The client 820 provides user input that is to be validated against a verification code checksum generated by the at least two verification code generators.

Figure 9:
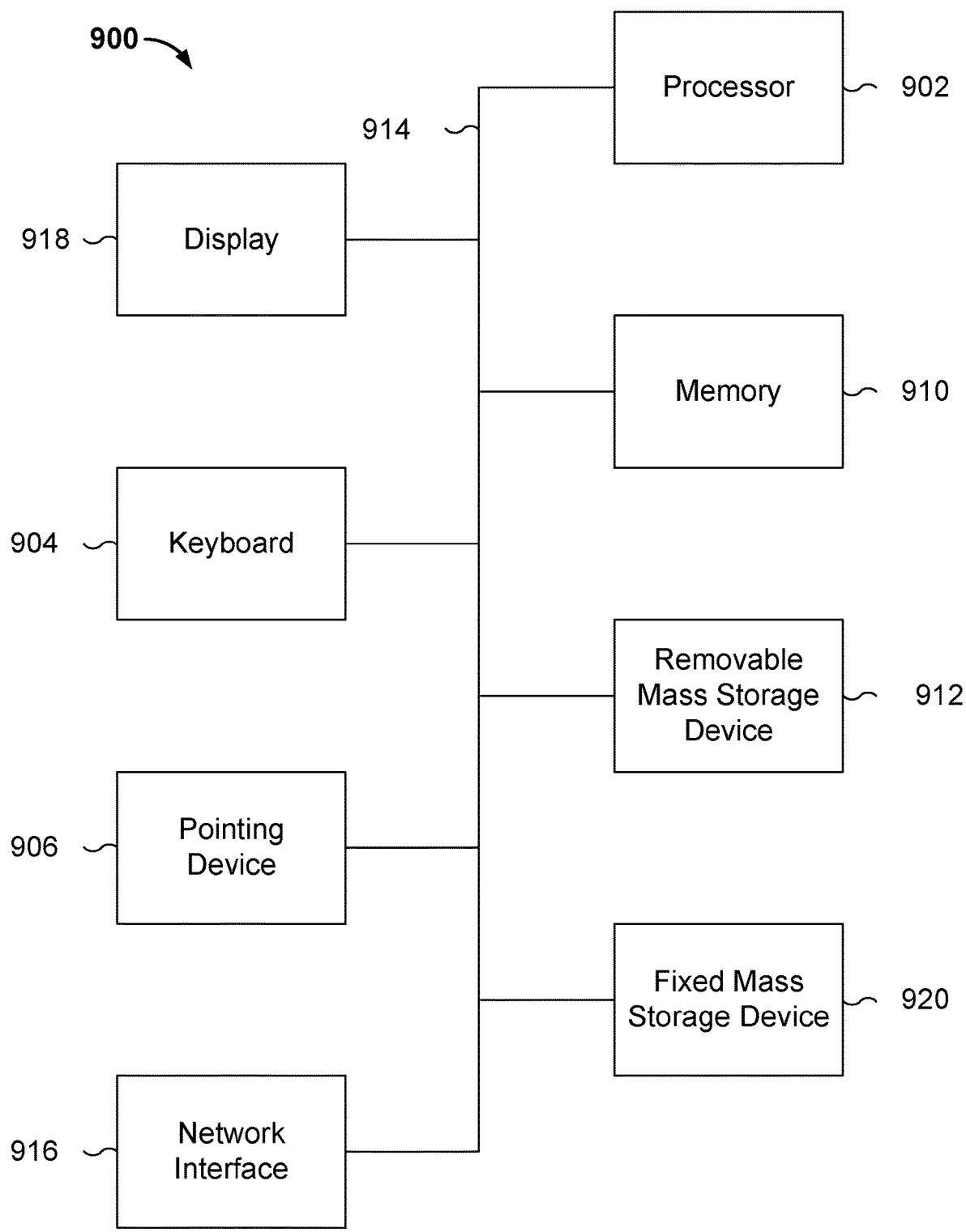
FIG. 9 is a functional diagram illustrating an embodiment of a programmed computer system for generating verification codes.

FIG. 9 is a functional diagram illustrating an embodiment of a programmed computer system for generating verification codes. As will be apparent, other computer system architectures and configurations can be used to generate verification codes. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918).

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer-readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for authenticating a user based on verification codes, comprising:
    selecting, using a hardware processor, at least three verification code generators from a verification code generator set comprising a plurality of verification code generators to compose a current use set, wherein at least three verification code generators include a first verification code generator, a second verification code generator, and a third verification code generator, the first verification code generator, the second verification code generator, and the third verification code generator having a digital verification mode, an ASCII character verification mode, a Chinese character verification mode, a speech verification mode, a question-and-answer verification mode, a picture-based verification mode, or any combination thereof, the first verification code generator and the second verification code generator being associated with different verification modes, the third verification code generator being associated with any verification mode, and wherein the selecting of the at least three verification code generators comprises:
        combining the at least three verification code generators associated with two or more verification modes;
        determining whether a screening technique for the combined at least three verification code generators associated results in a number of authentication failures within a time segment exceeds or is equal to a predetermined threshold; and
        in response to a determination that the number of authentication failures within the time segment exceeds or is equal to the predetermined threshold, increasing a number of verification code generators in the current use set to be selected, the increased number of verification code generators includes an additional verification mode;
    executing, using the hardware processor, each verification code generator in the current use set to obtain corresponding partial verification codes;
    composing, using the hardware processor, a current verification code from the partial verification codes;
    outputting the current verification code to a user, comprising:
        displaying, using a display, the current verification code to the user;
    receiving a user response that is made in response to the current verification code, wherein the user response is a single user response; and
    comparing, using the hardware processor, the current verification code and the user response to determine whether the user is verified.

2. The method as described in claim 1, wherein the selecting of the at least three verification code generators from the verification code generator set comprises:
    specifying a screening technique from a plurality of pre-established screening techniques, the plurality of screening techniques specifying a respective plurality of sequences of verification code generators; and
    selecting the at least three verification code generators from the verification code generator set based on the specified screening technique.

3. The method as described in claim 2, wherein:
    the pre-established screening techniques have varying levels of complexity; and
    the specifying of the screening technique from the pre-established screening techniques includes: selecting the screening technique of a certain level of complexity based on historical behavior records of the user.

4. The method as described in claim 2, wherein the specifying of the screening technique from the pre-established screening techniques comprises: randomly selecting the screening technique from the pre-established screening techniques.

5. The method as described in claim 1, wherein the composing of the current verification code from the partial verification codes comprises: composing the current verification code from the partial verification codes corresponding to a sequence of the at least three verification code generators in the current use set.

6. The method as described in claim 1, further comprising: composing a current verification code checksum from partial verification code checksums generated by each verification code generator in the current use set.

7. The method as described in claim 1, wherein the first verification code generator and the second verification code generator each relate to a numerical verification code generator, a mixed ASCII character verification code generator, a Chinese verification code generator, a question-and-answer verification code generator, a picture-based verification code generator, an ASCII character verification mode, or a question-and-answer verification mode.

8. A system for authenticating a user based on verification codes, comprising:
    a display;
    at least one processor configured to:
        select at least three verification code generators from a verification code generator set comprising a plurality of verification code generators to compose a current use set, wherein the at least three verification code generators include a first verification code generator, a second verification code generator and a third verification code generator, the first verification code generator, the second verification code generator, and the third verification code generator having a digital verification mode, an ASCII character verification mode, a Chinese character verification mode, a speech verification mode, a question-and-answer verification mode, a picture-based verification mode, or any combination thereof, the first verification code generator and the second verification code generator being associated with different verification modes the third verification code generator being associated with any verification mode, and wherein the selecting of the at least three verification code generators comprises to:
  combine the at least three verification code generators associated with two or more verification modes;
  determine whether a screening technique for the combined at least three verification code generators associated results in a number of authentication failures within a time segment exceeds or is equal to a predetermined threshold; and
  in response to a determination that the number of authentication failures within the time segment exceeds or is equal to the predetermined threshold, increase a number of verification code generators in the current use set to be selected, the increased number of verification code generators includes an additional verification mode;
  execute each verification code generator in the current use set to obtain corresponding partial verification codes;
  compose a current verification code from the partial verification codes;
  output the current verification code to a user, comprising to:
    display, using the display, the current verification code to the user;
  receive a user response that is made in response to the current verification code, wherein the user response is a single user response; and
  compare the current verification code and the user response to determine whether the user is verified; and
a memory coupled to the at least one processor and configured to provide the at least one processor with instructions.

9. The system as described in claim 8, wherein the selecting of the at least three verification code generators from the verification code generator set comprises to:
  specify a screening technique from a plurality of pre-established screening techniques, the plurality of screening techniques specifying a respective plurality of sequences of verification code generators; and
  select the at least three verification code generators from the verification code generator set based on the specified screening technique.

10. The system as described in claim 9, wherein:
the pre-established screening techniques have varying levels of complexity; and
the specifying of the screening technique from the pre-established screening techniques includes: selecting the screening technique of a certain level of complexity based on historical behavior records of the user.

11. The system as described in claim 9, wherein the specifying of the screening technique from the pre-established screening techniques comprises to: randomly select the screening technique from the pre-established screening techniques.

12. The system as described in claim 8, wherein the composing of the current verification code from the partial verification codes comprises to: compose the current verification code from the partial verification codes corresponding to a sequence of the at least three verification code generators in the current use set.

13. The system as described in claim 8, wherein the at least one processor is further configured to:
  compose a current verification code checksum from partial verification code checksums generated by each verification code generator in the current use set.

14. A computer program product for authenticating a user based on verification codes, the computer program product being embodied in a tangible non-transitory computer readable storage medium and comprising computer instructions for:
  selecting at least three verification code generators from a verification code generator set comprising a plurality of verification code generators to compose a current use set, wherein the at least three verification code generators include a first verification code generator, a second verification code generator, and a third verification code generator, the first verification code generator, the second verification code generator, and the third verification code generator having a digital verification mode, an ASCII character verification mode, a Chinese character verification mode, a speech verification mode, a question-and-answer verification mode, a picture-based verification mode, or any combination thereof, the first verification code generator and the second verification code generator being associated with different verification modes, the third verification code generator being associated with any verification mode, and wherein the selecting of the at least three verification code generators comprises:
    combining the at least three verification code generators associated with two or more verification modes;
    determining whether a screening technique for the combined at least three verification code generators associated results in a number of authentication failures within a time segment exceeds or is equal to a predetermined threshold; and
    in response to a determination that the number of authentication failures within the time segment exceeds or is equal to the predetermined threshold, increasing a number of verification code generators in the current use set to be selected, the increased number of verification code generators includes an additional verification mode;
  executing each verification code generator in the current use set to obtain corresponding partial verification codes;
  composing a current verification code from the partial verification codes;
  outputting the current verification code to a user, comprising:
    displaying, using a display, the current verification code to the user;
  receiving a user response that is made in response to the current verification code, wherein the user response is a single user response; and
  comparing the current verification code and the user response to determine whether the user is verified.

15. The computer program product as described in claim 14, wherein the selecting of the at least three verification code generators from the verification code generator set comprises:
- specifying a screening technique from a plurality of pre-established screening techniques, the plurality of screening techniques specifying a respective plurality of sequences of verification code generators; and
- selecting the at least three verification code generators from the verification code generator set based on the specified screening technique.

16. The computer program product as described in claim 15, wherein:
- the pre-established screening techniques have varying levels of complexity; and
- the specifying of the screening technique from the pre-established screening techniques includes: selecting the screening technique of a certain level of complexity based on historical behavior records of the user.

17. The computer program product as described in claim 15, wherein the specifying of the screening technique from the pre-established screening techniques comprises: randomly selecting the screening technique from the pre-established screening techniques.

18. The computer program product as described in claim 14, wherein the composing of the current verification code from the partial verification codes comprises: composing the current verification code from the partial verification codes corresponding to a sequence of the at least three verification code generators in the current use set.

19. The computer program product as described in claim 14, further comprising: composing a current verification code checksum from partial verification code checksums generated by each verification code generator in the current use set.

* * * * *